Sept. 19, 1939.　　　　G. S. LUNGE　　　　2,173,719
CONTROL SYSTEM
Filed Sept. 17, 1938
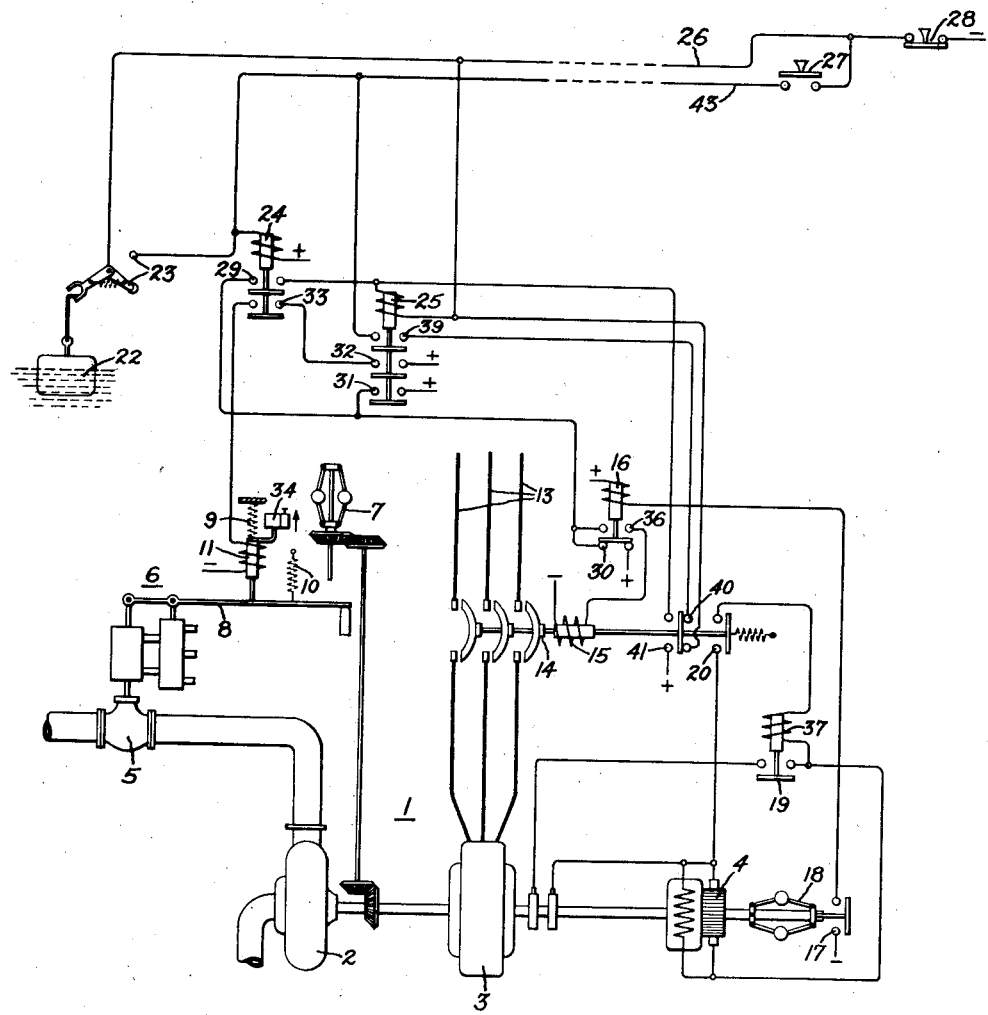
Inventor:
George S. Lunge,
by Harry E. Dunham
His Attorney.

Patented Sept. 19, 1939

2,173,719

UNITED STATES PATENT OFFICE 2,173,719

CONTROL SYSTEM

George S. Lunge, Scotia, N. Y., assignor to General Electric Company, a corporation of New York Application September 17, 1938, Serial No. 230,455

16 Claims. (Cl. 290—7)

My invention relates to control systems and particularly to control systems for prime mover dynamo-electric plants, and one of its objects is to provide an improved arrangement for controlling a prime mover dynamo-electric plant so that, under certain operating conditions, the plant supplies power to an electric system and under other operating conditions, the synchronous machine of the plant operates as a synchronous condenser.

My invention will be better understood from the following description when taken in connection with the accompaying drawing, the single figure of which diagrammatically illustrates a control system for a prime mover dynamo-electric plant embodying my invention, and its scope will be pointed out in the appended claims.

Referring to the accompanying drawing, 1 represents a prime mover dynamo-electric plant including a water wheel 2 driving a synchronous generator 3 and a direct current exciter 4. The supply of water to the water wheel 2 is controlled by a gate 5 which in turn is controlled by suitable governing means 6, which in the particular arrangement shown in the drawing includes the fly balls 7 driven by the water wheel 2. The fly balls 7 may be arranged in any suitable manner, examples of which are well known in the art, so that the position thereof controls the position of a movable member 8 which in turn controls the opening position of the gate or valve 5. As diagrammatically shown in the drawing, the movable member 8 is in the gate-closed position and is held in that position by a closing spring 9 against the bias of an opening spring 10 as long as a governor magnet 11 is deenergized. When it is desired to place the prime mover plant 1 in operation, it is necessary to energize the governor magnet 11 which is arranged so that its energization moves the closing spring 9 out of operative relation with the movable member 8 and allows the opening spring 10 to move the movable member 8 to a gate-opening position. As long as the governor magnet 11 is energized, the gate-opening position of the member 8 depends upon the position of the fly balls 7 of the governor 6.

The generator 3 is arranged to be connected to an energized electric system 13 by a circuit breaker 14 having an operating winding 15, which when energized maintains the circuit breaker 14 closed. The circuit of the operating winding 15 is controlled by a control relay 16, the circuit of which is controlled by the contacts 17 of a suitable speed responsive device 18 driven by the water wheel 2. The speed responsive device 18 is designed so that its contacts 17 are closed to complete the circuit of the control relay 16 whenever the generator is above a predetermined subsynchronous speed.

The field winding of the generator 3 is arranged to be connected across the brushes of the direct current exciter 4 by a field switch 19, the operating winding of which is connected across the brushes of the exciter 4 by the auxiliary contacts 20 of the circuit breaker 14 when it is closed.

For controlling the operation of the prime mover plant 1 in response to the amount of water available for operating the plant, I provide a float switch 22, which may be located at any suitable point, as in the reservoir supplying water to the plant, so that the contacts 23 are closed whenever the amount of water available exceeds a predetermined amount. The contacts 23 control the energization of a control relay 24 which in turn controls the energization of a master control relay 25. This master relay 25 controls the circuits of the prime mover plant 1 so that whenever the master relay 25 and the control relay 24 are energized, it effects the starting up of the prime mover plant and whenever the master relay is deenergized, it effects the shutting down of the prime mover plant.

The operation of the prime mover plant 1 is also arranged to be controlled from a remote point by means of the normally open manually controlled starting switch 27 and the normally closed manually controlled stopping switch 28. The closing of the manually controlled starting switch 27 is arranged to effect the starting up of the plant 1 independently of the contacts 23 controlled by the float switch 22, and the opening of the contacts 28 is arranged to effect the shutting down of the plant 1 independently of the position of the float switch 22.

In accordance with my invention, I control the circuits of the master relay 25 and the governor magnet 11 in such a manner that under certain operating conditions the prime mover plant 1 is operated so that the synchronous machine 3 supplies electric power to the system 13 and under other operating conditions the machine 3 operates as a synchronous condenser. These results are accomplished by controlling the energizing circuits of the relays 24 and 25 so that after they have both been energized to effect the starting up of the plant 1, the relay 24 can be deenergized either with or independently of relay 25. When only the relay 24 is deenergized, it effects the deenergization of the governor magnet 11 without effecting the opening of the circuit breaker 14 so that after the gate 5 is closed the synchronous machine 3 remains in operation as a synchronous condenser. When both of the relays 24 and 25 are deenergized, the operating coil 15 of the circuit breaker 14 and the governor magnet 11 are both deenergized to effect the closing of the gate 5 and the disconnection of the machine 3 from the circuit 13.

The operation of the control system shown in the drawing is as follows: When the plant 1 is shut down and the water level increases so that the float switch 22 closes its contacts 23, a circuit is completed for control relay 24 through contacts 23 of float switch 22, control wire 26 and stop switch 28 at the remote control station. Relay 24 by closing its contacts 29 completes an energizing circuit for master relay 25 through stop switch 28 at the remote control station, control conductor 26, winding of relay 25, contacts 29 of relay 24 and contacts 30 of relay 16. The closing of contacts 31 of relay 25 completes a shunt circuit around the contacts 30 of relay 16. The closing of contacts 39 of relay 25 completes, through the auxiliary contacts 40 on circuit breaker 14, a shunt circuit around the contacts 23 of the float switch 22 in the energizing circuit of relay 24. By closing its contacts 32, relay 25 completes through contacts 33 of relay 24 an energizing circuit for the governor magnet 11 which moves the closing spring 9 out of operative relation with the movable member 8 of the governor 6 so that the opening spring 10 moves the member 8 in a direction to effect the opening of the gate 5. If desired, the opening movement of the member 8 may be retarded by suitable retarding means such as a dashpot 34. As soon as the water wheel 2 starts and accelerates to a predetermined speed, the fly balls 7 operate to limit the opening movement of the member 8 so as to maintain the water wheel 2 at the desired operating speed.

When the water wheel speed reaches a predetermined value in response to the opening of the gate 5, the speed responsive switch 18 closes its contacts 17 and completes an energizing circuit for the control relay 16. The closing of the contacts 36 of the relay 16 completes through contacts 31 of relay 25 an energizing circuit for the operating winding 15 of the circuit breaker 14 so that the armature winding of the machine 3 is connected to the electric circuit 13. The closing of the auxiliary contacts 41 of the circuit breaker 14 completes a locking circuit for the master relay 25. As soon as the voltage of the exciter 4 is above a predetermined value after the circuit breaker 14 is closed, the operating winding 37 of the field switch 19 is sufficiently energized to close the switch 19 so as to connect the field winding of the machine 3 across the brushes of the exciter 4. The machine now operates as a synchronous generator supplying current to the electric circuit 13. Preferably the exciter 4 is arranged so that it overexcites the field winding of the machine 3.

When the water level decreases so that the float switch 22 opens its contacts 23, the heretofore described circuit for relay 24 is opened so that it in turn becomes deenergized and by opening its contacts 33 effects the deenergization of the governor magnet 11 so that the gate 5 is closed to shut off the input to the prime mover 2. The opening of the contacts 29 of the relay 24, however, does not effect the deenergization of the master relay 25 as the circuit of this relay is still completed through the auxiliary contacts 41 of the circuit breaker 14 and the stop switch 28 at the remote station. Consequently, the machine 3 remains connected to the circuit 13 and operates as a synchronous condenser.

When the machine 3 is operating either as a generator or a condenser, it may be shut down by opening the stop switch 28 at the remote station. The opening of this stop switch 28 effects the deenergization of the master relay 25 and also the deenergization of the control relay 24 if it happens to be energized. The opening of the contacts of the master relay 25 effects, in an obvious manner, the shutting down of the plant 1.

If the plant is shut down on account of low water, it can be started by momentarily closing the start switch 27 at the remote station so that an energizing circuit is completed for the control relay 24 through control conductor 43 and stop switch 28. The energization of relay 24 then effects, in the manner above described, the starting of the plant 1. As soon as the circuit breaker 14 closes, the opening of its auxiliary contacts 40 effects the deenergization of the control relay 24 so that the governor magnet 11 is deenergized. The machine 3, however, remains connected to the circuit 13 so that it runs as a synchronous condenser until the stop switch 28 is opened or the float switch 22 closes its contacts 23 to energize the control relay 24.

If it is desired to operate the plant so that the machine 3 continuously supplies power to the circuit 13 irrespective of the water level, this can be accomplished by maintaining the start switch 27 closed continuously in any suitable manner so that the control relay 24 does not become deenergized when the circuit breaker 14 closes.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a prime mover dynamo plant including an electric circuit, a fluid operated prime mover connected to a synchronous dynamo-electric machine, and a source of fluid for said prime mover, a control arrangement for said plant including a control device responsive to the amount of fluid available in said source, and means controlled by said control device for effecting the starting up of said prime mover and the connection of said machine to said circuit when the amount of fluid available exceeds a predetermined amount and the shutting off of fluid to said prime mover without disconnecting said machine from said circuit when the amount of fluid available decreases below a predetermined amount while said plant is in operation.

2. In a prime mover dynamo plant including an electric circuit, a fluid operated prime mover connected to a synchronous dynamo-electric machine, and a source of fluid for said prime mover, a control arrangement for said plant including a control device responsive to the amount of fluid available in said source, means controlled by said control device for effecting the starting up of said prime mover and the connection of said machine to said circuit when the amount of fluid available exceeds a predetermined amount and the shutting off of fluid to said prime mover without disconnecting said machine from said circuit when the amount of fluid available decreases below a predetermined amount while said plant is in operation, and means for effecting the disconnection of said machine from said circuit.

3. In a prime mover dynamo-electric plant comprising an electric circuit and a fluid operated prime mover connected to a synchronous dynamo-electric machine, a control arrangement for said plant including a master relay, a control relay, means responsive to the simultaneous energization of said relays for effecting the operation of said prime mover and the connection of said machine to said circuit, means responsive to the deenergization of said control relay while said master relay is energized for shutting off the input to said prime mover without disconnecting said machine from said circuit, and means for selectively controlling the energization of said relays.

4. In a prime mover dynamo-electric plant comprising an electric circuit and a fluid operated prime mover connected to a synchronous dynamo-electric machine, a control arrangement for said plant including a master relay, a control relay, means responsive to the simultaneous energization of said relays for effecting the operation of said prime mover and the connection of said machine to said circuit, means responsive to the deenergization of said control relay while said master relay is energized for shutting off the input to said prime mover without disconnecting said machine from said circuit, means responsive to the deenergization of said master relay for effecting the shutting down of said prime mover and the disconnection of said machine from said circuit, and means for selectively controlling the energization of said relays.

5. In a prime mover dynamo-electric plant comprising an electric circuit and a prime mover connected to a synchronous dynamo-electric machine, a control arrangement for said plant including a control relay, means for effecting the energization and deenergization of said control relay, a master relay, means responsive to the energization of said control relay for effecting the energization of said master relay, means responsive to the simultaneous energization of said relays for effecting the operation of said prime mover, means responsive to the speed of said machine and the energization of said master relay for connecting said machine to said circuit, and means responsive to the deenergization of said control relay while said master relay is energized for shutting off the input to said prime mover without disconnecting said machine from said circuit.

6. In a prime mover dynamo-electric plant comprising an electric circuit and a prime mover connected to a synchronous dynamo-electric machine, a control arrangement for said plant including a control relay, means for effecting the energization and deenergization of said control relay, a master relay, means responsive to the energization of said control relay for effecting the energization of said master relay, means responsive to the simultaneous energization of said relays for effecting the operation of said prime mover, means responsive to the speed of said machine and the energization of said master relay for connecting said machine to said circuit, means responsive to the deenergization of said control relay while said master relay is energized for shutting off the input to said prime mover without disconnecting said machine from said circuit, means responsive to the deenergization of said master relay for effecting the disconnection of said machine from said circuit, and means for selectively controlling the energization of said master relay.

7. In a prime mover dynamo-electric plant comprising an electric circuit and a prime mover connected to a synchronous dynamo-electric machine, a control arrangement for said plant including a control relay, means for effecting the energization and deenergization of said control relay, a master relay, means responsive to the energization of said control relay for effecting the energization of said master relay, means responsive to the simultaneous energization of said relays for effecting the operation of said prime mover, means responsive to the speed of said machine and the energization of said master relay for connecting said machine to said circuit, means responsive to the connection of said machine to said circuit for maintaining said master relay energized independently of the energization of said control relay, and means responsive to the deenergization of said control relay while said master relay is energized for shutting off the input to said prime mover without disconnecting said machine from said circuit.

8. In a prime mover dynamo-electric plant comprising an electric circuit and a prime mover connected to a synchronous dynamo-electric machine, a control arrangement for said plant including a control relay, means for effecting the energization and deenergization of said control relay, a master relay, means responsive to the energization of said control relay for effecting the energization of said master relay, means responsive to the simultaneous energization of said relays for effecting the operation of said prime mover, means responsive to the speed of said machine and the energization of said master relay for connecting said machine to said circuit, means responsive to the connection of said machine to said circuit for maintaining said master relay energized independently of the energization of said control relay, means responsive to the deenergization of said control relay while said master relay is energized for shutting off the input to said prime mover without disconnecting said machine from said circuit, means responsive to the deenergization of said master relay for effecting the disconnection of said machine from said circuit, and means for selectively controlling the energization of said master relay.

9. In a prime mover dynamo-electric plant comprising an electric circuit, a fluid operated prime mover connected to a synchronous dynamo-electric machine and a source of fluid for said prime mover, a control arrangement for said plant including a control relay, a master relay, means responsive to the energization of said control relay for effecting the energization of said master relay, means responsive to the simultaneous energization of said relays for causing fluid to be supplied from said source to said prime mover, means responsive to the speed of said machine and the energization of said master relay for connecting said machine to said circuit, means responsive to the deenergization of said control relay while said master relay is energized for shutting off the supply of fluid from said source to said prime mover, and means responsive to the amount of fluid available in said 10. In a prime mover dynamo-electric plant comprising an electric circuit, a fluid operated prime mover connected to a synchronous dynamo-electric machine and a source of fluid for said prime mover, a control arrangement for said plant including a control relay, a master relay, means responsive to the energization of said control relay for effecting the energization of said master relay, means responsive to the simultaneous energization of said relays for causing fluid to be supplied from said source to said prime mover, means responsive to the speed of said machine and the energization of said master relay for connecting said machine to said circuit, means responsive to the deenergization of said control relay while said master relay is energized for shutting off the supply of fluid from said source to said prime mover, means responsive to the amount of fluid available in said source for controlling the energization of said control relay, and control means for effecting the disconnection of said machine from said circuit after said control relay is deenergized.

11. In a prime mover dynamo-electric plant comprising an electric circuit, a fluid operated prime mover connected to a synchronous dynamo-electric machine and a source of fluid for said prime mover, a control arrangement for said plant including a control relay, a master relay, means responsive to the energization of said control relay for effecting the energization of said master relay, means responsive to the simultaneous energization of said relays for causing fluid to be supplied from said source to said prime mover, means responsive to the speed of said machine and the energization of said master relay for connecting said machine to said circuit, means responsive to the deenergization of said control relay while said master relay is energized for shutting off the supply of fluid from said source to said prime mover, means responsive to the connection of said machine to said circuit for maintaining said master relay energized independently of the energization of said control relay, and means responsive to the amount of fluid available in said source for controlling the energization of said control relay.

12. In a prime mover dynamo-electric plant comprising an electric circuit, a fluid operated prime mover connected to a synchronous dynamo-electric machine and a source of fluid for said prime mover, a control arrangement for said plant including a control relay, a master relay, means responsive to the energization of said control relay for effecting the energization of said master relay, means responsive to the simultaneous energization of said relays for causing fluid to be supplied from said source to said prime mover, means responsive to the speed of said machine and the energization of said master relay for connecting said machine to said circuit, means responsive to the deenergization of said control relay while said master relay is energized for shutting off the supply of fluid from said source to said prime mover, means responsive to the connection of said machine to said circuit for maintaining said master relay energized independently of the energization of said control relay, means responsive to the amount of fluid available in said source for controlling the energization of said control relay, and control means for effecting the deenergization of said master relay irrespective of the amount of fluid available in said source.

13. In a prime mover dynamo-electric plant comprising an electric circuit, a fluid operated prime mover connected to a synchronous dynamo-electric machine and a source of fluid for said prime mover, a control arrangement for said plant including a control relay, a master relay, means responsive to the energization of said control relay for effecting the energization of said master relay, means responsive to the simultaneous energization of said relays for causing fluid to be supplied from said source to said prime mover, means responsive to the speed of said machine and the energization of said master relay for connecting said machine to said circuit, means responsive to the deenergization of said control relay while said master relay is energized for shutting off the supply of fluid from said source to said prime mover, means responsive to the connection of said machine to said circuit for maintaining said master relay energized independently of the energization of said control relay, means responsive to the amount of fluid available in said source for controlling the energization of said control relay, and control means for selectively controlling the energization of said relays irrespective of the amount of fluid available in said source.

14. In a prime mover dynamo plant including an electric circuit, a fluid operated prime mover connected to a synchronous dynamo-electric machine, and a source of fluid for said prime mover, a control arrangement for said plant including a control device responsive to the amount of fluid available in said source, means controlled by said control device for effecting the starting up of said prime mover and the connection of said machine to said circuit when the amount of fluid available exceeds a predetermined amount and the shutting off of fluid to said prime mover without disconnecting said machine from said circuit when the amount of fluid available decreases below a predetermined amount while said plant is in operation, and control means independent of the amount of fluid available in said source for effecting the starting up of said prime mover and the connection of said machine to said circuit and the shutting off of fluid to said prime mover without disconnecting said machine from said circuit.

15. In a prime mover dynamo plant including an electric circuit, a fluid operated prime mover connected to a synchronous dynamo-electric machine, and a source of fluid for said prime mover, a control arrangement for said plant including a control device responsive to the amount of fluid available in said source, means controlled by said control device for effecting the starting up of said prime mover and the connection of said machine to said circuit when the amount of fluid available exceeds a predetermined amount and the shutting off of fluid to said prime mover without disconnecting said machine from said circuit when the amount of fluid available decreases below a predetermined amount while said plant is in operation, and control means for effecting the starting up of said prime mover and the connection of said machine to said circuit independently of the amount of water available in said source.

16. In a prime mover dynamo plant including an electric circuit, a fluid operated prime mover connected to a synchronous dynamo-electric machine, and a source of fluid for said prime mover, a control arrangement for said plant including a control device responsive to the amount of fluid available in said source, and means controlled by said control device for causing said plant to supply power to said electric circuit when the amount of fluid in said source exceeds a predetermined amount and for causing said machine to operate as a synchronous condenser connected to said circuit when the amount of fluid in said source is below a predetermined amount.

GEORGE S. LUNGE.